Patented Aug. 8, 1950

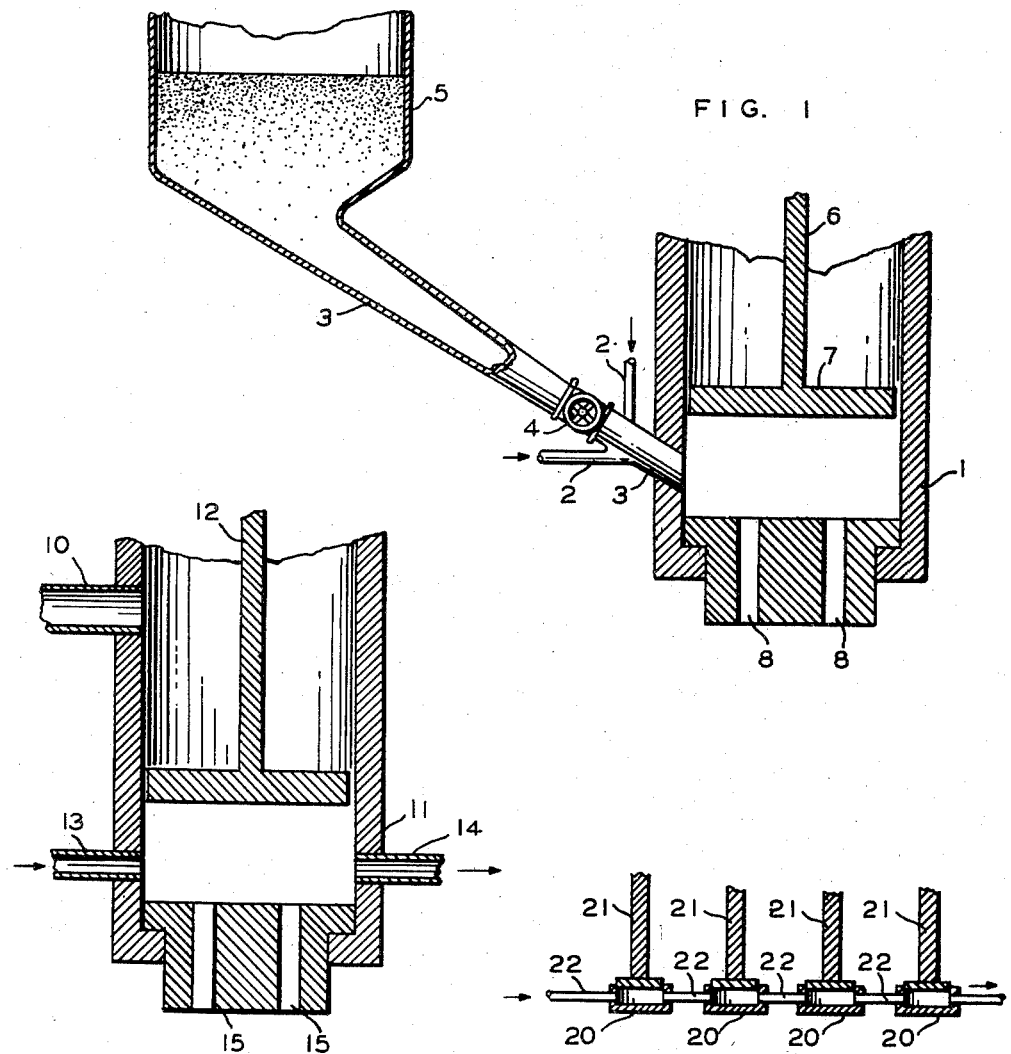
JOHN W. PAYNE
*INVENTOR.*
ATTORNEY OR AGENT

2,517,707

UNITED STATES PATENT OFFICE 2,517,707

MECHANICAL SHAPING OF POROUS MATERIALS

John W. Payne, Woodbury, N. J., assignor to Socony-Vacuum Oil Company, Incorporated, a corporation of New York Application July 20, 1949, Serial No. 105,865

14 Claims. (Cl. 25—156)

This invention relates to a method for producing mechanically shaped porous materials characterized by a high degree of physical hardness. More particularly, the present invention is directed to a process for improving the strength and hardness of mechanically shaped solid porous masses, such as those finding use as catalysts, adsorbents, desiccants, catalyst supports, carriers, building blocks, ornaments and various other applications where rigidity, crushing resistance and ability to withstand abrasion are considered desirable attributes.

Mechanically shaped porous materials have heretofore generally been formed into shapes of predetermined size, dimension and proportion by the application of pressure. Molding, pelleting and extrusion have been widely employed to impart the described shape or form. The porous, pressure-shaped products so produced have found wide favor in a variety of fields and industrial operations due to their relative ease of handling and the comparative rapidity with which the products can be produced.

Under the usual conditions of shaping, however, carried out in the presence of air by pressing a moist porous mass into the desired shape, the resulting pressed product often appears chalky and does not have adequate strength or hardness sufficient to resist abrasion under varied conditions of handling, treatment, and exposure. This undesirable property leads to crumbling and disintegration of the pressure-shaped materials during use, rendering them unsuited for their intended purpose and resulting in a loss of the desired shape previously imparted thereto. Moreover, the disintegration of the mechanically shaped product causes contamination of material brought in contact therewith. For example, it is well known that water and other volatile components can be removed from liquids and solid materials containing the same by agitation of the mixture with porous adsorbent particles such as those formed by extrusion or pelleting of a suitable adsorbent such as an inorganic oxide gel. Upon tumbling the mixture with mechanically shaped gel particles, a certain amount of breakage, chipping and abrasion of the gel particles occurs. This, in turn, contaminates the mixture undergoing treatment, necessitating either a subsequent refining operation to remove the gel fines or disposal of the contaminated material, thereby placing a distinct economic burden upon the processes employing such shaped gel particles. The importance of this problem is emphasized when it is considered that certain materials can only be efficiently dried by intimate contact with adsorbents of the above type. Among such materials are found chemical compounds which are decomposed by heat, organic substances which tend to char, biologicals in which potency is adversely affected by heat, and the like. Similarly, in other instances where a pressure-shaped porous mass is brought into contact with vapors or liquids or is subject to handling, the serious problem of breakage and abrasion of the mechanically shaped porous product is encountered.

Thus, many operations for the conversion of hydrocarbon materials are carried out in the presence of a porous contact mass composed of particles which themselves have a catalytc effect or which are impregnated with or act as a support for other catalytic material of a nature appropriate to the result desired. Such operations may contemplate the conversion of hydrocarbons of high boiling point to those of lower boiling point or the polymerization of light or gaseous hydrocarbons to hydrocarbons of higher boiling point. Other operations of similar nature employing solid porous catalytic particles include dehydrogenation, hydrogenation, polymerization, alkylation, re-forming, aromatization, desulfurization, oxidation, and other conversions of hydrocarbon materials.

These catalytic processes are advantageously carried out employing methods wherein the catalyst or contact material is subjected to continuous handling. In such operations a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines, which are a loss since they generally cannot be re-used in the same catalytic equipment. Furthermore, there is a tendency for the catalyst fines suspended in the gas or vapor present to act as an abrasive in a manner similar to sand blasting. This not only wears away the equipment but also causes the catalyst to take up foreign matter detrimental to its catalytic properties. A hard porous catalytic material having the ability to resist abrasion during the necessary handling involved in continual conversion and regeneration is definitely a desirable attribute in overcoming the disadvantages heretofore prevalent in the art.

Moreover, in hydrocarbon conversions carried out at elevated temperatures in the presence of solid porous catalysts, the deposition of carbon on the surface of the catalyst takes place. This carbonaceous coating soon covers the surface of the catalyst, necessitating removal of the coating before the catalyst can continue to promote the reaction. In some catalytic operations, the active life of the catalyst is only a few minutes "on stream," after which the carbon is removed by burning to reactivate the mass and permit efficient operation of the process. The provision of a catalyst which retains its porosity but has a high degree of hardness, rendering the same resistant to the thermal shock encountered upon being used in high temperature conversions and during repeated regeneration is a distinct advantage in any catalytic process.

A further problem of mechanically shaping porous materials exists in the forming of bricks or similar building blocks by the application of pressure. It is highly desirable that such materials, particularly those exposed to the natural elements, have a high physical strength and ability to resist wear. It has heretofore been noted that such mechanically shaped porous materials often appear chalky and are subject to abrasion and a wearing away of the exposed surface. A method for pressure-shaping such building units, whereby the physical hardness thereof is substantially improved, would obviously be a definite advantage to the building and construction trade.

One main object of this invention, therefore, is to provide porous mechanically shaped products of improved hardness characteristics. Another object is the provision of a process for improving the extrudability and handling strength of porous extruded particles such as adsorbents, catalysts, desiccants, and the like. A further object is to provide a method for producing pressure-shaped porous products having a high resistance to abrasion, chipping, and breakage. A still further object is the provision of hard porous particle-form pellets capable of withstanding severe thermal treatment and handling without adverse effect. A still further object is the provision of pressure-shaped bricks or other building units having an improved hardness and a greater ability to resist wear upon exposure to the natural elements. Other objects and advantages of this invention will be apparent to those skilled in the art from the following description.

In accordance with the process of this invention, it has been discovered that the hardness characteristics of mechanically shaped solid moisture-containing porous material can be effectively improved by sweeping air contained in and around said porous material with a water-soluble gas prior to the application of pressure. It has been found that if the moist porous granular or powdered feed material is first subjected to a stream of water-soluble gas and thereafter pressure-shaped, the resulting shaped mass has a substantially greater physical hardness than when the feed material is shaped by conventional procedure.

It would appear that the improved hardness characteristics of the mechanically shaped product obtained by the present procedure may be attributed to the substantial removal of air from the feed charge prior to the application of pressure. Under the usual procedures for mechanically shaping heretofore employed, loosely packed granular or powdered porous material was conducted to a mold, extrusion chamber or pelleting device and there pressed to yield a product of the desired shape. The loosely packed feed material contained a considerable quantity of air, only part of which was removed during the pressing operation, the remainder of the air being trapped within the porous mass so that the resulting mechanically shaped product contained small quantities of occluded air. The presence of small air pockets in the porous shaped mass has a direct effect on the hardness properties of the shaped product, rendering the same chalky and subject to crumbling and abrasion. Upon removing the air from the moist charge material by sweeping with a water-soluble gas prior to the application of pressure and thereafter pressing the treated mass, it has been discovered that the resulting pressure-shaped product has distinctly improved hardness characteristics. The mechanically shaped material so obtained is suitably employed in a variety of fields and operations requiring hard porous shaped products, thereby greatly expanding the uses to which porous shaped products may be put.

Any method of replacing air contained in and around a moist porous feed charge with a water-soluble gas prior to pressing the same is within the purview of this invention. Thus, the porous feed material may be swept with a water-soluble gas while it is confined in the pressure zone of the particular pressing device employed or the porous feed material may be exposed to a stream of water-soluble gas as it is being added to the pressing or shaping zone of the particular device employed.

Feasible means for accomplishing the objects of this invention are shown in the attached drawing.

Referring more particularly to the drawing, Fig. 1 is a sectional view of a suitable device where the porous feed material is swept with a water-soluble gas at it is being added to the pressing zone of the device.

Fig. 2 is a sectional view of a suitable device for mechanically shaping porous material where the feed material is swept with a water-soluble gas while it is confined in the pressure zone of the device.

Fig. 3 is a suitable device for simultaneously molding or pelleting a number of mechanically shaped products while passing a water-soluble gas therethrough.

Referring specifically to Fig. 1, the interior of extrusion chamber I is swept substantially free of air by passing a water-soluble gas through a number of nozzles 2 positioned along the circumference of conduit 3, valve 4 in conduit 3 being closed so that the water-soluble gas passes into the extrusion chamber. Thereafter valve 4 is opened and porous charge material passes from feed chamber 5 through conduit 3 and is swept substantially free of air by water-soluble gases passing through nozzles 2. The porous feed material substantially saturated with water-soluble gas then passes into the interior of the extrusion chamber. Upon the application of pressure to the porous charge by the downward movement of extrusion ram 6, a part of the gas contained in the porous feed material escapes through a small clearance between the cylinder wall and ram head 7 before the clearance becomes sealed by the charge. Residual gas dissolves under pressure in the water contained in the charge. As the extrusion ram proceeds downward, the porous material is forced through the die openings 8. The extruded spaghetti-like material may thereafter be cut into lengths of desired size and dried to yield small porous particles of satisfactory strength sufficient to withstand any necessary handling. In the absence of the preliminary treatment with water-soluble gas, the particles produced are of inferior physical strength and non-uniform, and chalky in appearance. In addition, sweeping of the charge with a water-soluble gas prior to extrusion improves the uniformity of flow of the extruded material through the die openings. In the absence of the preliminary treatment with water-soluble gas, a somewhat erratic and uneven flow of the feed charge results, yielding a porous, physically weaker product.

Referring specifically to Fig. 2, the porous feed charge is introduced through conduit 10 to the interior of an extrusion chamber 11. Thereafter, the extrusion ram 12 is lowered until contact with the porous feed charge is made. Water-soluble gas is then fed through conduit 13, passing through the porous feed charge and removing air therefrom. The mixture of air and water-soluble gas passes from the extrusion chamber through conduit 14. Thereafter, pressure is applied to the porous feed charge by the downward movement of the extrusion ram. This pressure causes a part of the gas to escape through a small clearance between the cylinder wall and the head of the extrusion ram. Residual gas is dissolved under pressure in the water contained in the charge. As the application of pressure on the porous feed charge is increased, the material is extruded through the die openings 15. The extruded material may thereafter be treated in any desired manner, as indicated above. Such extruded material has a substantially greater physical hardness than material similarly processed but which has not undergone the above-described preliminary treatment with a water-soluble gas.

Referring specifically to Fig. 3, porous feed material is placed in a number of molds 20. A number of pistons 21 are then lowered until they are brought in contact with the porous feed material. A water-soluble gas is then passed through the porous feed material contained in the numerous molds by means of conduit 22, which serves to inter-connect the numerous molds so that water-soluble gas entering the first mold sweeps out air contained in the porous feed material and thereafter passes through the second mold, sweeping out air from the porous feed material contained therein, and so on, until the proportion of air contained in the water-soluble gas becomes too high to afford the desired results. The mixture of water-soluble gas and air is then withdrawn from contact with the feed material. Thereafter, the porous feed material is pressed into the desired shape, conforming to the shape of the particular mold employed, by the downward movement of the pistons 21. Upon release of the pressure, the pressed porous product is removed from the molds and is dried. The product so obtained was found to have an appreciably greater physical hardness than porous feed materials similarly processed but which had not been treated with a water-soluble gas prior to the application of pressure.

While the de-airing of the porous feed charge with a water-soluble gas is preferably carried out immediately prior to shaping the same by the application of pressure and in the same apparatus to avoid undue contact with air, it is entirely within the scope of this invention that the preliminary treatment of the porous charge with water-soluble gas and the subsequent mechanical shaping by pressure be carried out in separate pieces of apparatus. Thus, the porous charge may be swept with a water-soluble gas to substantially de-air the same in a suitable chamber and thereafter be transferred to the particular pressing or shaping device to be employed. It is essential, however, for purposes of this invention, that any prolonged contact of the porous charge with air be strictly avoided after it has once undergone treatment with water-soluble gas.

It is contemplated that any porous material, compound, or any mixture of porous solid materials may be mechanically shaped in accordance with the process of this invention. The charge material may thus be any of the porous adsorbent materials commonly subjected to mechanical shaping, such as granular or powdered charcoal, various naturally occurring clays, inorganic oxide hydrogels, gelatinous precipitates, porous ceramic composites, and a multitude of other moisture-containing porous materials or mixtures of such materials. For example, silica hydrogel may be admixed with various metal oxide hydrogels such as those of alumina, zirconia, titania, manganese oxide, thoria, and the like. These various hydrogels may be composited by any one of a number of methods. For example, silica and alumina hydrogels may be formed separately from solutions of suitable salts and then mixed mechanically or a hydrosol of silica and alumina may be prepared which sets to a silica-alumina hydrogel. Also, silica hydrogel may be immersed in solutions of metal salts and hydrous oxides deposited upon the silica hydrogel by means of hydrolytic adsorption, after which the mass may be formed into any desired shape, in accordance with the process of this invention. Furthermore, solids which are not obtainable thoroughly admixed with other solids may be so mixed by mechanical means upon adding two or more materials to a ball mill, rod mill, or other pulverizing unit and agitating or grinding the materials until the desired intimacy of mixing is attained. Thus, various porous clays or other porous materials of a ceramic nature may be composited and mixed prior to undergoing treatment in accordance with the procedure described herein.

The porous charge material should be characterized by sufficient moisture to lend a proper degree of plasticity to the charge so that the granular or powdered particles thereof will cohere to one another upon the application of pressure. In the case where the charge is a dry, porous mass, water is preferably admixed therewith and the resultant mixture kneaded, ball milled, or otherwise agitated to bring the charge in condition suitable for the mechanical shaping thereof. In those instances where the charge is made up of wet clay, freshly formed hydrogel, or other material having an excess of moisture, the amount of water contained in the charge may be decreased by admixing with a dry powdered porous material, which may be either of the same or a different composition from that of the wet charge stock. In the case of hydrogels, water contained therein may be released by freezing and thawing of the hydrogel in accordance with the general procedure described in U. S. Patent 2,480,669. It is thus contemplated that any of the preliminary treatments for placing the moist, porous charge material in form suitable for mechanical shaping thereof, which have previously been used in the prior art, may be employed in readying the charge material for use in the present mechanical shaping method.

The amount of water-soluble gas employed during the preliminary step of the present process will generally be such as to substantially de-air the porous charge material. The particular amount of water-soluble gas used will be largely dependent on the nature and condition of the specific charge. Generally, at least one volume of water-soluble gas per volume of loosely packed porous charge will be employed. The amount of water-soluble gas used, however, will ordinarily not exceed about 10 volumes of water-soluble gas at normal conditions of temperature and pressure per volume of loosely packed porous charge material. For example, de-airing the porous charge with about 2 volumes of water-soluble gas per volume of porous charge material in accordance with the described procedure has been found to produce a smooth, hard product having excellent handling characteristics.

Any of the water-soluble gases which are inert to the porous charge material undergoing treatment may be employed in the process of this invention. Generally, because of their economy and availability, the inorganic water-soluble gases, such as carbon dioxide, ammonia, sulfur dioxide, hydrogen sulfide, and the like will be employed. Of this list, carbon dioxide being easily obtained and having high solubility in water, is preferred for use in the present procedure of this invention.

After preliminary treatment with water-soluble gas, the porous charge is shaped into the desired form by the application of pressure. The pressure applied will be that usually employed in the conventional shaping operations wherein the preliminary treatment with water-soluble gas has been omitted. The particular pressure employed will thus vary widely depending upon the nature of the porous charge material and the use to which it is to be put. Usually after the porous material has been mechanically shaped, it is subjected to an elevated temperature to dry the same. However, a porous material mechanically shaped in accordance with the process of this invention may undergo any other after-treatment commonly employed in the art.

The water content of the porous mass undergoing pressure-shaping is ordinarily such as to give a firm product, while containing sufficient moisture to permit cohesion of the individual particles on the application of pressure. The particular amount of water in the charge material depends on the composition and state of sub-division of the material. Generally, however, the water content of the porous charge will be between about 50 and about 85 per cent by weight of moisture. While water is present as the moistening or binding material for lending the desired degree of plasticity to the porous charge, other binding materials or agents capable of aiding extrusion or pelleting may be present in the charge. Thus, the porous charge may have admixed therewith small amounts of castor-oil, oleic acid, dextrin, various naturally occurring or synthetic gums, and other lubricants or improving agents for facilitating the mechanical shaping of the porous mass. The following examples will serve to illustrate the method of this invention without limiting the same:

Example 1

A silica-alumina hydrosol was prepared by mixing 1.00 volume of a solution of sodium silicate containing 157.0 grams of $SiO_2$ per liter and 1.00 volume of a solution containing 39.79 grams of aluminum sulfate and 30.51 grams of sulfuric acid per liter. The resulting colloidal solution was ejected from a nozzle in the form of globules into a column of gas oil whose depth was about eight feet. The globules of solution fell through the oil and gelled before passing into a layer of water located beneath the oil. The time of gelation for the concentrations and proportions of reactants given above was about 4 seconds. The spheroidal particles of hydrogel were conducted out of the bottom of the column into a stream of water and, on removal from the water, base-exchanged with an aqueous solution of aluminum sulfate and water-washed.

The hydrogel particles were then frozen by immersion in kerosene maintained at a temperature of 15° F. The frozen hydrogel was then drained free of kerosene and thawed by heating with live steam to a temperature above 32° F. Freezing and thawing cause the hydrogel particles to disintegrate into small granules and release about 63 to 67 per cent by weight of water originally present in the freshly formed hydrogel. The water so released was decanted off and the residual hydrogel granules centrifuged in a basket-type centrifuge for 1½ minutes at about 3300 R. P. M. to give a hydrogel of 75-77 per cent by weight moisture content. The hydrogel granules were then conducted to an extrusion device similar to that shown in Fig. 2 of the accompanying drawing and swept with about 10 volumes of carbon dioxide per volume of hydrogel granules to substantially de-air the same. The carbon dioxide treated charge was then extruded under a pressure of 800 pounds per square inch through die openings of approximately ¼" diameter. The resultant spaghetti-like material was cut into particles of approximately ¼" length. The extruded hydrogel particles were dried at a temperature of 90° F. (dry bulb) and 70 per cent relative humidity by circulation of air through a 2" bed of the particles at a rate of about 100 cubic feet per minute per square foot of hydrogel cross sectional area. The drying time required to reach equilibrium was about 12 hours.

At the end of this time, the resultant dried particles were tempered by heating in an electric furnace at the rate of 1° F. per minute until a temperature of 500° F. was reached, and thereafter by heating at a rate of 3° F. per minute until a temperature of 1400° F. was reached. The particles were held at this temperature for 10 hours and then permitted to cool, yielding hard, porous silica-alumina gel particles.

For purposes of comparison, a silica-alumina hydrogel was prepared and extruded as described above with the exception that the preliminary gas treatment with carbon dioxide was omitted. The two batches of extruded particles were compared as to appearance, handling strength, density, and hardness. The two forms of gel were subjected to a hardness test which consists of tumbling an 80 c. c. sample of material in a one-pound grease can with eight 1⅛" steel balls, 50 grams each at 80 R. P. M. on a paint roller mill for a period of one hour, then screening the same to determine the quantity which was powdered and broken down to a size smaller than the original. The percentage of unbroken particles is designated as hardness index. The results are summarized below:

| Nature of Porous Charge Material | Silica-Alumina Hydrogel | |
|---|---|---|
| De-airing Gas Used | $CO_2$ | None. |
| Inspection of Freshly Extruded Particles: | | |
| Appearance | Smooth | Chalky. |
| Handling Strength | Good | Fair. |
| Inspection of Finished Particles: | | |
| Packed Density (gms. per cc.) | 0.65 | 0.56. |
| Hardness Index | 66 | 11. |

*Example II*

A silica-alumina-manganese oxide hydrogel was prepared by mixing 1.00 volume of sodium silicate containing 157.0 grams of $SiO_2$ per liter and 1.00 volume of a solution containing 39.79 grams of aluminum sulfate and 30.51 grams of sulfuric acid per liter to give a silica-alumina hydrogel as described in the preceding example. The hydrogel was then base-exchanged with aqueous solutions containing two equivalent weights of manganese sulfate and one-half equivalent weight of ammonium sulfate based on the zeolitic sodium content of the hydrogel (about 4 per cent $Na_2O$). The amount of MnO incorporated into the silica-alumina hydrogel by this means was about 4 per cent by weight based on the finished dry product. The other components of silica and alumina, being present in respective amounts of about 90 per cent and about 6 per cent by weight, were based on the finished dry gel.

The resulting silica-alumina-manganese oxide hydrogel was then frozen, thawed, and centrifuged, as in Example 1. The hydrogel granules so obtained were placed in an extrusion chamber similar to that shown in Fig. 2 of the drawings and about 6 volumes of carbon dioxide per volume of loosely packed hydrogel granules were passed through the same to substantially de-air the hydrogel charge. The carbon dioxide treated charge was then extruded under a pressure of 700 pounds per square inch and the resulting extruded material was cut into particles and dried as described in the preceding example.

A second batch of silica-alumina-manganese oxide hydrogel was prepared and extruded in accordance with the above procedure, except that the preliminary treatment with carbon dioxide was omitted. The two batches of extruded particles were compared as to appearance, handling strength, density, and hardness. The results are summarized below:

| Nature of Porous Charge Material | Silica-Alumina Manganese Oxide Hydrogel | |
|---|---|---|
| De-airing Gas Used | $CO_2$ | None. |
| Inspection of Freshly Extruded Particles: | | |
| Appearance | Smooth | Slightly chalky. |
| Handling Strength | Excellent | Fair. |
| Inspection of Finished Particles: | | |
| Packed Density (gms. per c. c.) | 0.67 | 0.61. |
| Hardness Index | 85 | 76. |

*Example III*

An extrudable mass of a silica-alumina porous clay of the type used in promoting the catalytic cracking of petroleum hydrocarbons was prepared by mixing 12 pounds of clay with 2400 c. c. of water in a mechanical mixer for a period of about 7 minutes.

A part of the clay was thereafter placed in an extruder and the air contained in the clay charge was flushed out with carbon dioxide. The de-aired charge was then extruded under a pressure of 800 pounds per square inch. The resulting extruded spaghetti-like material was cut into particles and dried for 18 hours at room temperature and then tempered at 1050° F. for 3 hours.

A second batch of clay from the mixing operation was extruded directly, omitting the preliminary treatment with carbon dioxide. The extruded mass was then cut into particles, dried and tempered as above. The two batches of extruded particles were compared as to appearance, handling strength, density and hardness. The results are summarized below:

| Nature of Porous Charge Material | Clay | |
|---|---|---|
| De-airing Gas Used | $CO_2$ | None. |
| Inspection of Freshly Extruded Particles: | | |
| Appearance | Smooth | Slightly chalky. |
| Handling Strength | Good | Fair. |
| Inspection of Finished Particles: | | |
| Packed Density (gms./c. c.) | 0.64 | 0.62. |
| Hardness Index | 94 | 85. |

It will thus be seen from the foregoing examples that the handling strength and hardness characteristics of porous mechanically shaped materials are greatly improved by subjecting the charge material to a preliminary de-airing operation with a water-soluble gas wherein air contained in the porous charge material is substantially replaced with water-soluble gas. While the method of this invention has been illustrated with the use of inorganic oxide hydrogels and porous clay, it is contemplated that the described method may be generally employed in improving the hardness of any porous material mechanically shaped by the application of pressure, wherein air is contained in the charge subjected to pressure. Those skilled in the art will, accordingly, recognize and understand that the particular chemical composition of the charge employed in the present procedure is of little consequence and that the method of this invention may be used in treating any moist, porous material from which air may be removed by treatment with a water-soluble gas prior to the application of pressure to impart a pre-determined shape to the porous material.

I claim:

1. A method for mechanically shaping solid moisture-containing porous material, which comprises feeding a charge of said material to a shaping device, removing air contained in and around said material by sweeping with a water-soluble gas and thereafter pressing the gas-treated material into a predetermined shape.

2. A method for improving the hardness characteristics and handling strength of porous mechanically shaped material, which comprises the substantial removal of air from a finely divided mass of porous moisture-containing material by sweeping said material with a water-soluble gas and immediately thereafter pressing the porous material into predetermined shape.

3. In a method for mechanically shaping solid moisture-containing porous material by the application of pressure, the improvement which comprises the replacement of air contained in and around said porous material with a water-soluble gas prior to the application of pressure.

4. A process for improving the hardness characteristics of a mechanically shaped solid moisture-containing porous material, which involves the step of removing air from the pores of said material by replacing the same with a water-soluble gas and immediately thereafter shaping the porous material by the application of pressure.

5. A method for mechanically shaping moist, porous clay, which comprises removing air contained in and around a charge of said clay by sweeping the same with a water-soluble gas and thereafter subjecting the clay to pressure.

6. A method for mechanically shaping inorganic oxide hydrogel, which comprises removing air contained in and around a charge of said gel by sweeping the same with a water-soluble gas and thereafter subjecting the hydrogel to the application of pressure.

7. A method for improving the hardness characteristics and handling strength of extruded clay particles, which comprises removing air contained in and around a charge of finely divided moist clay by sweeping the same with a water-soluble gas, extruding the gas-treated clay without bringing the same into contact with air, cutting the extruded clay into particles of predetermined length and drying said particles to yield a hard, porous particle-form product having a high resistance to abrasion.

8. A method for extruding a finely divided moist mass of clay, which comprises the substantial replacement of air contained in said clay with a water-soluble gas and immediately thereafter passing said clay through an extrusion die.

9. A method for extruding a finely divided moist mass of inorganic oxide hydrogel, which comprises the substantial replacement of air contained in said hydrogel with a water-soluble gas and immediately thereafter passing said hydrogel through an extrusion die.

10. In a process for producing an extruded porous material, the step which involves preliminary treatment of a moist charge of said material with a water-soluble gas to expel air contained in and about said material immediately prior to the extrusion thereof.

11. A method for mechanically shaping moist, porous material, which comprises removing air contained in and about said porous material by sweeping with carbon dioxide and thereafter pressing the carbon dioxide-treated material into predetermined shape.

12. A method for improving the hardness characteristics and handling strength of porous mechanically shaped particles, which comprises replacing air contained in a finely divided moist mass of porous material with a water-soluble gas, thereafter shaping the porous material by the application of pressure and drying said shaped material to yield a hard, porous product.

13. A method for extruding clay, which comprises treating a charge of moist, porous clay with carbon dioxide to substantially remove air contained in said charge and thereafter forcing the clay through an extrusion die.

14. A method for extruding inorganic oxide hydrogel, which comprises the substantial replacement of air contained in and around a charge of said hydrogel with carbon dioxide and thereafter pressing the hydrogel through an extrusion die.

JOHN W. PAYNE.

No references cited.